Aug. 5, 1941.　　　A. ARUTUNOFF　　　2,251,816
SUBMERGIBLE ELECTRIC MOTOR FOR DEEP WELL PUMPS
Filed May 11, 1938
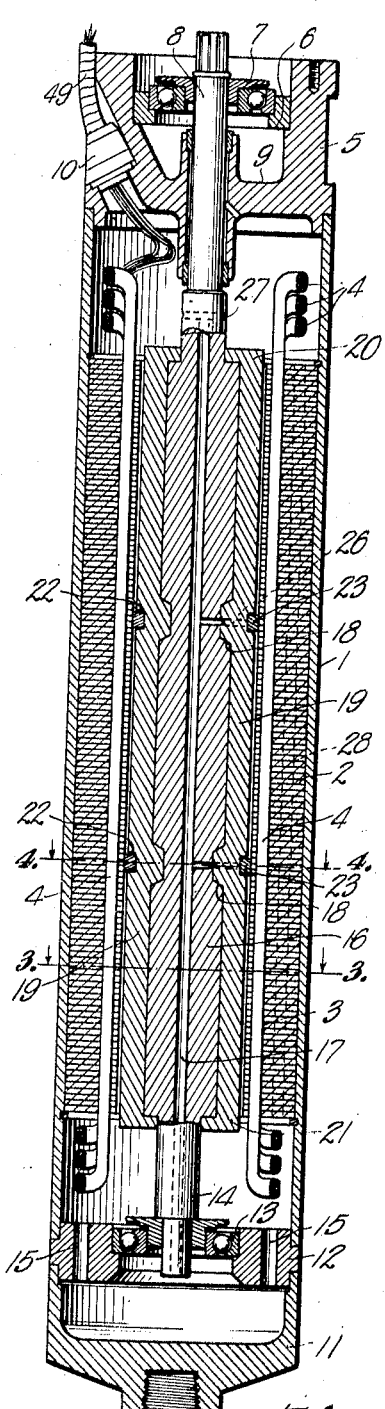
Fig. 1.
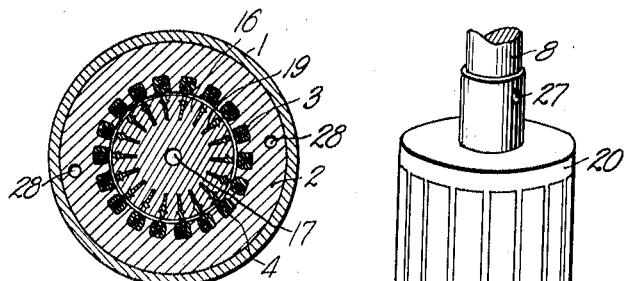
Fig. 3.
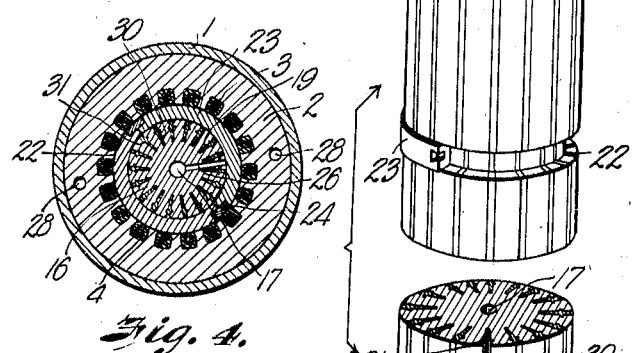
Fig. 4.
Fig. 5.
Fig. 6.
Fig. 2.
INVENTOR
Armais Arutunoff
BY
Thos. E. Scofield
ATTORNEY Patented Aug. 5, 1941

2,251,816

UNITED STATES PATENT OFFICE 2,251,816

SUBMERGIBLE ELECTRIC MOTOR FOR DEEP WELL PUMPS

Armais Arutunoff, Bartlesville, Okla., assignor to Reda Pump Company, Bartlesville, Okla., a corporation of Delaware Application May 11, 1938, Serial No. 207,213

5 Claims. (Cl. 172—120)

My invention relates to submergible electric motors for deep well pumps and more particularly to an electric motor adapted to operate a pump in a single unit positioned at the bottom of a deep well.

A deep well such as an oil well or a water well must necessarily be of comparatively small diameter. Most oil wells, for example, are equipped with a well casing having a seven inch diameter. The wells may vary in depth over wide limits, as for example, from 1,000 feet to 7,000 feet or more. The provision of an electric motor for driving a pump positioned within a casing of such small diameter, which pump is designed to lift oil over a mile, is a difficult problem. We have at the outset the limitation of the external diameter of the motor. The motor having a small external diameter must be able to develop sufficient power to raise the oil, water or brine, depending upon the well in which the pump-motor unit is employed. The limitation in the diameter of the motor requires that it be extremely long in order to develop the requisite power. For example, I have built a motor developing 120 horsepower, having an external diameter of five and one quarter inches, and having a length of 23 feet. It will be seen that the motor is over fifty times as long as its diameter.

In the ordinary constructions of squirrel cage rotors for motors of such length, it has been necessary, at frequent intervals, to support the rotor shaft. This necessitates the provision of a plurality of rotors though a single stator may be used. Such a construction has been shown in my prior Patent 1,654,774, in which I employ a plurality of rotors within a single elongated stator.

One object of my invention is to provide a construction in which a single elongated rotor may be employed with an elongated stator.

Another object of my invention is to provide a rotor construction for a squirrel cage rotor in which few rotor bearings need be employed.

Another object of my invention is to provide a rotor construction in which non-magnetic laminations are not required for the rotor supporting rings.

Other and further objects of my invention will appear from the following description.

In the accompanying drawing which forms part of the instant specification and are to be read in conjunction therewith and in which like reference numerals are used to indicate like parts in the various views, Figure 1 is a sectional elevation of a motor showing one embodiment of my invention.

Figure 2 is a perspective view of the rotor, with a part cut away, used in the embodiment shown in Figure 1.

Figure 3 is a sectional view taken on a line 3—3 of Figure 1.

Figure 4 is a sectional view taken on a line 4—4 of Figure 1.

Figure 5 is a perspective view of one form of rotor bearing ring.

Figure 6 is a perspective view of another form of rotor bearing ring.

Referring now to the drawing, within a housing 1 I assemble a plurality of laminations 2 forming the active iron for the field. The laminations are provided with notches 3 which, when assembled, form slots through which the stator winding conductors 4 pass. The upper end of housing 1 is closed by a member 5 which carries a spider 6 supporting a bearing 7 for the upper end of the rotor shaft 8. The member 5 is formed with a partition 9 forming a closure for the motor housing. Current for the operation of the motor is passed to the windings through conductors lodged in cable 49. The cable 49 terminates in a connector 10 adapted to seat in water and oil tight relation upon a passageway formed in the member 5. The lower end of the housing 1 is closed by closure member 11. A partition member 12 supports a bearing 13 for the lower end 14 of the rotor shaft. The partition 12 is formed with passageways 15.

The rotor proper 16 is formed of a single piece of steel and is turned to provide reduced end portions forming the rotor shaft ends 8 and 14. The rotor is provided with a central bore 17. A plurality of slots 30 are milled longitudinally of the rotor proper, the slots being provided with lateral grooves 31. At a plurality of places 18 along the slots 30, adjacent the points of positioning bearing rings, the slots are deepened as can readily be seen by reference to Figure 1. The rotor thus prepared is then placed in a mold and the slots filled with molten metal forming conductor bars 19. The metal may be aluminum, copper, brass or the like. Cast integrally with the conductor bars 19 at opposite ends thereof are short circuiting rings 20 and 21, electrically interconnecting the conductor bars. Grooves 22 are turned in the rotor at places where the bearing rings are to be placed. It is important for motor efficiency that the air gap between the rotor and the stator be at a minimum. My construction above described results in a very stiff rotor, giving it sufficient rigidity to resist bending from vibration or unequal magnetic pull, enabling the use of a very small air gap even though the rotor is of great length with respect to its diameter. In order to support the rotor, at intermediate places, I provide bearing rings 23 which fit in the grooves 22. The bearing rings may be made of any suitable material and may be of any desired construction. In Figure 5, I have shown a bearing ring 23 of split construction, held in place by butterfly keys 24. In Figure 6, I have shown a bearing ring 23, provided with an internal groove adapted to hold roller bearings 25. The bearing rings, if desired, may be made out of non-magnetic metal or out of non-conductive material such as a phenol composition product or the like.

Adjacent the bearing rings I provide ducts 26 communicating with the bore 17. In use, the entire motor casing is filled with oil. When the rotor is revolving, oil is thrown out of ducts 26 by centrifugal force, lubricating the bearing rings. Oil is also thrown out of upper cross duct 27 so that oil will continuously flow up bore 17, out through ducts 26 and 27 and downwardly through passageways 28, provided in the stator laminations, into the lower portion of the housing for recirculation.

It will be seen that I have accomplished the objects of my invention. I have provided an elongated rotor of great rigidity, even though exceedingly long with respect to its diameter. The stiffness of the rotor is such that it will resist bending from vibration or unequal magnetic pull, enabling me to employ a small air gap without danger of the rotor touching the stator during rotation. I am able to have a rotor of maximum, unsupported length or a rotor of greater length than has been heretofore possible with fewer supports. The conducting bars are cast in the rotor proper in slots of such shape that the bars are locked in place, preventing displacement of the conductors by centrifugal force.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. In an electric motor, a stator having a continuous winding, a squirrel cage rotor for said stator, said rotor having conductor bars disposed peripherally therearound and extending substantially the length of said rotor, circumferential grooves formed in said rotor assembly and supporting rings resting upon said stator and lodged in said grooves.

2. A motor as in claim 1 in which said rotor is formed of a single piece of material having grooves formed therein, and said conductor bars are cast in said grooves.

3. An electric motor as in claim 1 in which said rotor is formed of a single piece of metal having end portions forming shafts, grooves formed in said rotor, said conductor bars being positioned in said grooves.

4. An electric motor as in claim 1 in which said rotor is formed of a single piece of metal having reduced end portions forming shafts, longitudinal grooves formed on said rotor, said conductor bars being positioned in said grooves, a longitudinal bore extending axially of said rotor providing an oil circulation channel and transverse bores communicating with said axial bore and said bearing rings.

5. In an electric motor, a stator having a continuous winding, a squirrel cage rotor for said stator, said rotor having conductor bars disposed peripherally therearound and extending substantially the length of said rotor, a circumferential groove formed in said rotor assembly, and supporting rings resting upon said stator and lodged in said groove.

ARMAIS ARUTUNOFF.